(12) United States Patent (10) Patent No.: US 12,650,154 B2

Rösseler et al. (45) Date of Patent: Jun. 9, 2026

(54) DAMPING-VALVE DEVICE WITH A PROGRESSIVE DAMPING- FORCE CHARACTERISTIC CURVE

(71) Applicant: ZF FRIEDRICHSHAFEN AG, Friedrichshafen (DE)

(72) Inventors: Jörg Rösseler, Ruppichteroth (DE); Aleksandar Knezevic, Eitorf (DE); Stefan Liehmann, Hofheim i. UFr. (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 392 days.

(21) Appl. No.: 18/276,897

(22) PCT Filed: Feb. 15, 2022

(86) PCT No.: PCT/EP2022/053649

§ 371 (c)(1),
(2) Date: Aug. 11, 2023

(87) PCT Pub. No.: WO2022/175254

PCT Pub. Date: Aug. 25, 2022

(65) Prior Publication Data

US 2024/0117853 A1     Apr. 11, 2024

(30) Foreign Application Priority Data

Feb. 16, 2021     (DE) ..................... 10 2021 201 441.0

(51) Int. Cl.
F16F 9/18          (2006.01)
F16F 9/34          (2006.01)

(52) U.S. Cl.
CPC ..................................... F16F 9/18 (2013.01)

(58) Field of Classification Search
CPC .... F16F 9/18; F16F 9/19; F16F 9/5126; F16F 9/348; F16F 9/512; F16F 9/3487; F16F 2228/14; F16F 9/3485; F16F 9/50
See application file for complete search history.

(56) References Cited

U.S. PATENT DOCUMENTS 1,150,925 A * 8/1915 Benner ...................... F16F 9/49
                                                                    188/317
3,175,645 A * 3/1965 Schafer ...................... F16F 9/49
                                                                    188/282.6

(Continued)

FOREIGN PATENT DOCUMENTS

DE          102016210790          12/2017
DE          102017204923          9/2018

(Continued)

OTHER PUBLICATIONS

Bach et al. English translation DE 102017211300 B3, 2025 (Year: 2018).*

(Continued)

*Primary Examiner* — Robert A. Siconolfi
*Assistant Examiner* — James K Hsiao
(74) *Attorney, Agent, or Firm* — COZEN O'CONNOR

(57)          ABSTRACT

A damping valve device for a vibration damper has a restriction in connection with a valve element movable from an open position into a restriction position depending on the flow velocity of a damping medium inside the restriction. The valve element, as a variable-diameter annular element, moves in closing direction with increasing flow velocity of the damping medium within an annular groove of a valve support. The annular groove is constructed as a pressure space having at least one inflow orifice and at least one outflow orifice. The valve element is positioned at a radial distance from an annular groove base by centering elements.

5 Claims, 5 Drawing Sheets

(56)　　　　　　References Cited

U.S. PATENT DOCUMENTS

| | | | | | |
|---|---|---|---|---|---|
| 3,863,676 | A | * | 2/1975 | Tarsha | F16L 55/04 |
| | | | | | 138/31 |
| 3,944,197 | A | * | 3/1976 | Dachicourt | F16F 9/52 |
| | | | | | 267/64.19 |
| 4,635,766 | A | * | 1/1987 | Street, Jr. | F16F 9/063 |
| | | | | | 188/317 |
| 9,091,318 | B2 | * | 7/2015 | Litterscheid | F16F 9/26 |
| 9,163,693 | B2 | * | 10/2015 | Förster | F16F 9/464 |
| 9,856,940 | B2 | * | 1/2018 | De Kock | F16F 9/5126 |
| 10,753,421 | B2 | * | 8/2020 | Rösseler | F16F 9/512 |
| 10,774,894 | B2 | * | 9/2020 | Jaśkiewicz | F16F 9/19 |
| 11,655,875 | B2 | * | 5/2023 | Kobayashi | F16K 15/148 |
| | | | | | 188/281 |
| 11,680,622 | B2 | * | 6/2023 | Kim | F16F 9/504 |
| | | | | | 188/275 |
| 2009/0127041 | A1 | * | 5/2009 | Denner | F16F 9/5126 |
| | | | | | 188/282.1 |
| 2014/0020996 | A1 | * | 1/2014 | Litterscheid | F16F 9/5126 |
| | | | | | 188/313 |
| 2014/0061986 | A1 | * | 3/2014 | Li | F16F 13/007 |
| | | | | | 267/140.13 |
| 2019/0128361 | A1 | * | 5/2019 | Rösseler | F16F 9/3485 |
| 2021/0108697 | A1 | * | 4/2021 | Rösseler | F16F 9/3487 |
| 2021/0108703 | A1 | * | 4/2021 | Rösseler | F16F 9/512 |
| 2021/0115998 | A1 | * | 4/2021 | Meinert | F16F 9/585 |
| 2022/0196106 | A1 | * | 6/2022 | Wimmer | F16F 9/369 |
| 2023/0366444 | A1 | * | 11/2023 | Schneider | F16F 9/062 |
| 2023/0400081 | A1 | * | 12/2023 | Montagna | F16F 9/3487 |
| 2024/0376953 | A1 | * | 11/2024 | Montagna | F16F 9/3487 |

FOREIGN PATENT DOCUMENTS

| | | |
|---|---|---|
| DE | 102017211300 | 10/2018 |
| DE | 102019212966 | 3/2021 |
| DE | 102019215556 | 4/2021 |
| DE | 102019215561 | 4/2021 |
| EP | 1724492 | 11/2006 |

OTHER PUBLICATIONS

Office Action for corresponding German Patent Application No. DE 10 2021 201 441.0.

* cited by examiner

DAMPING-VALVE DEVICE WITH A PROGRESSIVE DAMPING- FORCE CHARACTERISTIC CURVE

CROSS REFERENCE TO RELATED APPLICATIONS

This is a U.S. national stage of Application No. PCT/EP2022/053649 filed Feb. 15, 2022. Priority is claimed on German Application No. DE 10 2021 201 441.0 filed Feb. 16, 2021, the content of which is incorporated herein by reference.

BACKGROUND OF THE INVENTION

1. Field of the Invention

The disclosure is directed to a damping valve device with a progressive damping characteristic.

2. Description of the Related Art

DE 10 2016 210 790 A1 describes a damping valve device for a vibration damper. The damping valve device comprises a first damping valve. In a first operating range with increasing flow velocity of a damping medium, the first damping valve moves into an operating position in which damping medium is allowed to pass through. The first damping valve is formed, for example, by a piston valve or a bottom valve of the vibration damper. A second operating range with a progressive damping force characteristic of the vibration damper is influenced by a restriction in connection with a valve body, which is movable from an open position into a restriction position independent from the stroke position of a piston rod of the vibration damper depending on the flow velocity within the restriction position. The valve body movies in closing direction with increasing flow velocity of the damping medium. This generates an additional damping force which obviates the use of a conventional tension stop or compression stop which is only effective in an end position of the piston rod.

The restriction and the damping valve are arranged in series hydraulically. The valve body is constructed as an annular element with variable diameter which executes a radial closing movement in direction of a flow guiding surface in which a defined minimum cross-sectional opening area is maintained.

DE 10 2019 212 966 A1 discloses that the annular element with variable diameter is additionally assisted by a pressure force inside of a pressure chamber formed by an annular groove.

The variable-diameter annular element is radially floatingly guided in the annular groove of the valve support at least on a large circumferential area. Accordingly, there is an undefined operating behavior particularly when the damping valve device is activated.

SUMMARY OF THE INVENTION

One aspect of the present invention is to solve the problem known from the prior art.

One aspect of the invention is that the annular groove is constructed as a pressure space having at least one inflow orifice and at least one outflow orifice, the valve element being positioned at a radial distance from an annular groove base by centering elements.

Because of the centering elements, it is ensured via the pressure space that the lateral surface of the valve element is acted upon by pressure. In addition, distances of the valve element from the flow guiding surface are appreciably more uniform so that the operating behavior of the damping valve device is subject to smaller damping force deviations.

In a further advantageous configuration, the centering elements are formed by segments that are supported at the annular groove base. Depending on the configuration of the valve element, this valve element can also be constructed as an elastic component, e.g., as an elastomer ring. The valve element would be more difficult to produce because of a material accumulation for the segments.

The segments can be combined to form a support ring to facilitate assembly. The support ring can then form a center portion of the valve support, for example.

The support ring can optionally form the valve support with at least one spacer sleeve and two cover disks. The support ring can then be constructed as a very thin ring that can be produced very easily as a punched component part.

The segments preferably have a smaller axial height than that of the pressure space. The loss of surface area acted upon by pressure, which is brought about through the contact of the segment with the valve element is minimized as far as possible. Further, the flow of damping medium in and through the pressure space is improved in this way.

An alternative type of construction is characterized in that a lateral surface of the valve element carries the segments.

With a view to a construction which is as simple as possible and economizes on material, the lateral surface of the valve element has receiving openings for the segments. By using separate segments, the valve element can also be produced in a simple manner by injection molding or sintering because material accumulations are avoided.

In a further embodiment form, at least one side surface of the annular groove has centering elements for the valve element. To this end, the side surface of the annular groove can have, e.g., a circumferential edge at which the valve element can be supported in the maximum open position.

BRIEF DESCRIPTION OF THE DRAWINGS

Aspects of the invention will be described in more detail referring to the following description of the figures. In the drawings.

DETAILED DESCRIPTION OF THE PRESENTLY PREFERRED EMBODIMENTS

Figure 1:
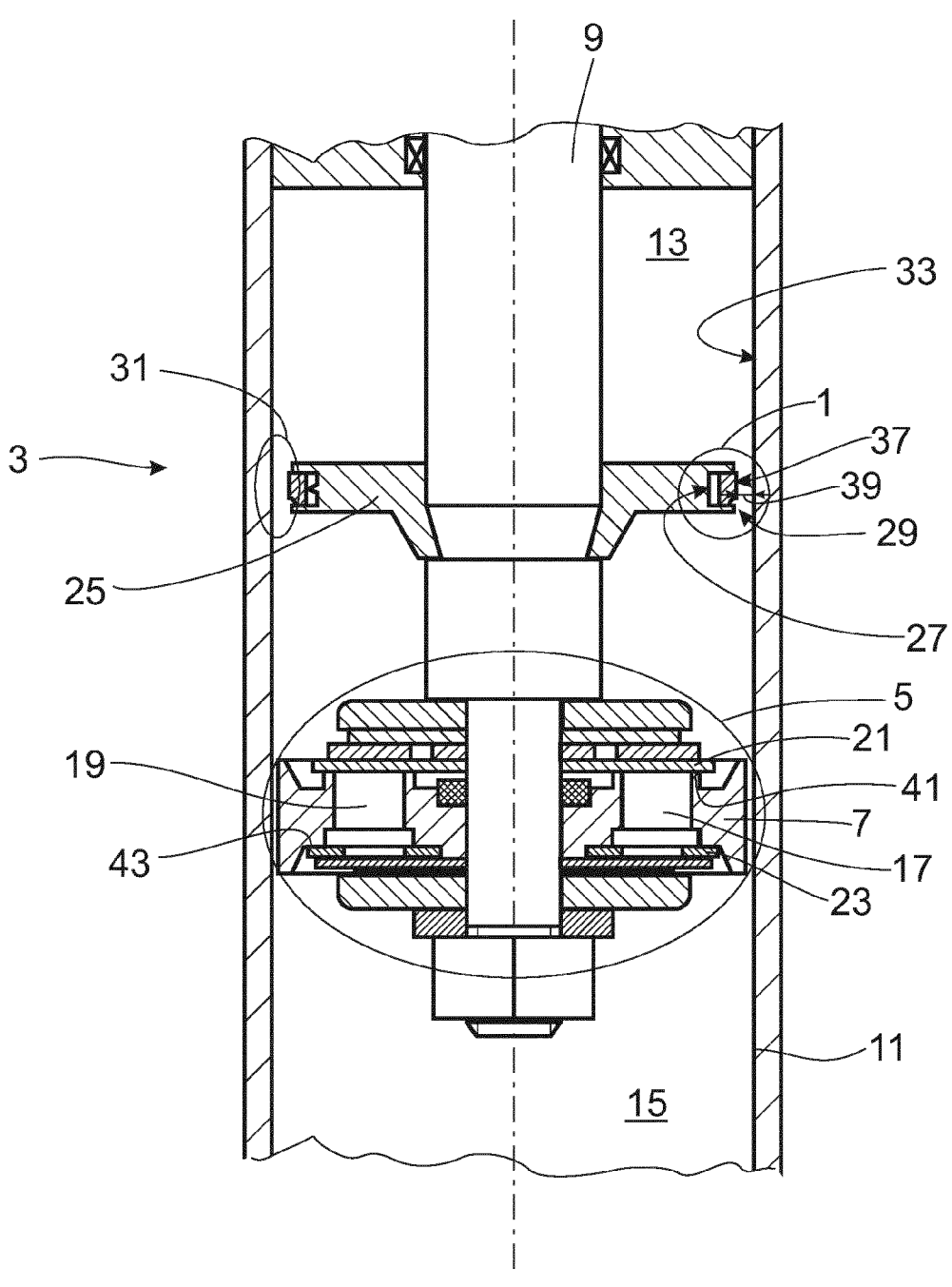
FIG. 1 is a fragmentary view of a vibration damper in the region of the damping valve device.

FIG. 1 shows a damping valve device 1 for a vibration damper 3 of optional construction type, shown only in a fragmentary manner. In addition to the damping valve device 1, the vibration damper 3 comprises a first damping valve 5 with a damping valve body which is constructed as a piston 7 and attached to a piston rod 9.

The damping valve body 7 divides a cylinder 11 of the vibration damper into a work space 13 on the piston rod side and a work space 15 remote of the piston rod, both of which are filled with damping medium. Passages 17; 19 for each through-flow direction are constructed on different pitch circles in the damping valve body 7. The configuration of the passages 17; 19 is merely exemplary. An outlet side of the passages 17; 19 is at least partially covered by at least one valve disk 21; 23.

For example, a valve support 25 of the damping valve device 1 is secured directly to the piston rod 9.

The valve support 25 has a circumferential annular groove 27 in which a valve element 29 with variable diameter is guided. This valve element 29 is radially movable or radially elastic and forms a valve body for a restriction 31 as part of the damping valve device 1. The valve element 29 forms the restriction 31 with an inner wall of the cylinder 11 which constitutes a flow guiding surface 33.

Figure 2:
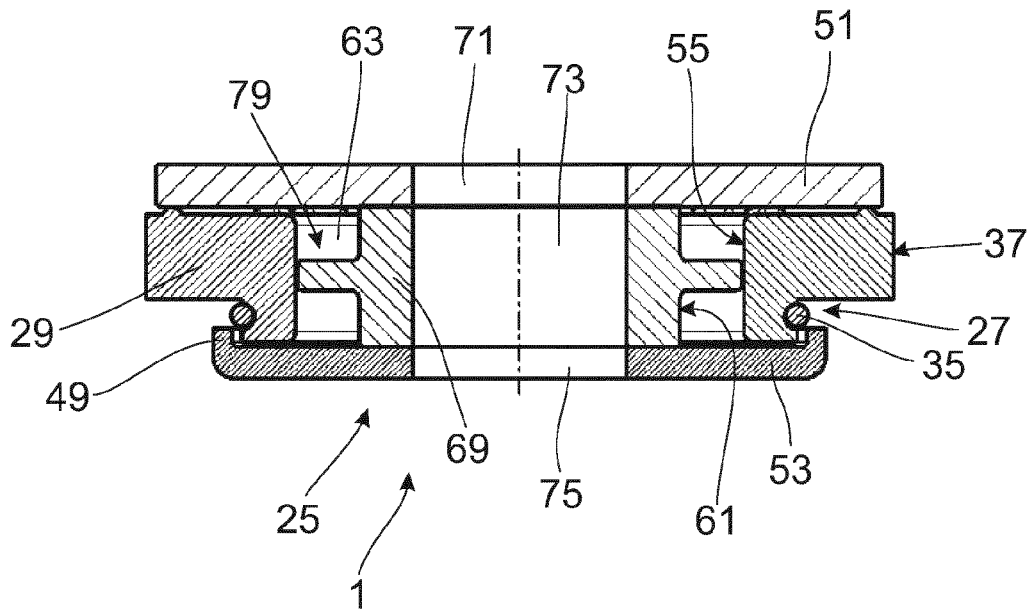
FIGS. 2-4 are the damping valve device according to FIG. 1 in detail.

The valve element 29 is outfitted with a return spring 35 as is shown, for example, in an enlarged view in FIG. 2. A variable restriction cross section 39 which produces an additional damping force is situated between the flow guiding surface 33 and an outer lateral surface 37 of the valve element 29.

At a piston rod velocity in a first operating range, e.g., less than 1 m/s, the restriction 31 is completely open. The damping force is then generated only by the passages 17; 19 in combination with the valve disks 21; 23. With flow impinging on the valve disks 21; 23, the valve disks 21; 23 lift from their valve seat surface 41; 43. The lifting movement is limited in each instance by a supporting disk 45; 47.

In a second operating range with a piston rod velocity greater than the limit velocity of the first operating range, i.e., greater than 1 m/s, which was indicated by way of example, the valve element 29 moves into a restriction position and, in so doing, executes a closing movement in direction of the flow guiding surface 33. As a result of the high flow velocity of the damping medium in the restriction 31 which is shaped as an annular gap, a negative pressure forms, which leads to a radial expansion of the valve element 29. However, in order to preclude a blockage of the restriction 31 under any circumstances, the defined minimum cross-sectional opening area can be maintained, e.g., by the return spring 35.

FIG. 2 shows a detail of the damping valve device 1 according to FIG. 1. It can be seen from the enlargement that the annular groove 27, together with an inner lateral surface 55 of the valve element 29, annular groove side surfaces 57; 59 of the cover disks 51; 53 and an annular groove base 61, forms a pressure space 63 which is connected to the work space of the vibration damper 3 via at least one inflow orifice 65 and an outflow orifice 67. The pressure space 63 reinforces the negative pressure condition existing in the restriction 37 via a radially outwardly directed force component expanding the valve element 29. The functional designations of inflow orifice and outflow orifice are to be switched analogously for an oppositely impinging flow of the damping valve device.

Figure 3:
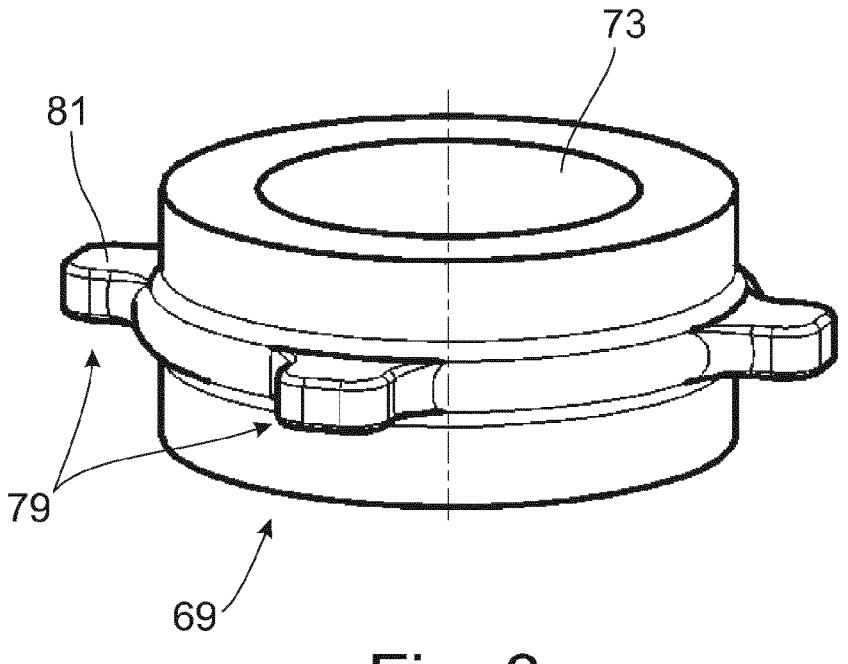
Figure 4:
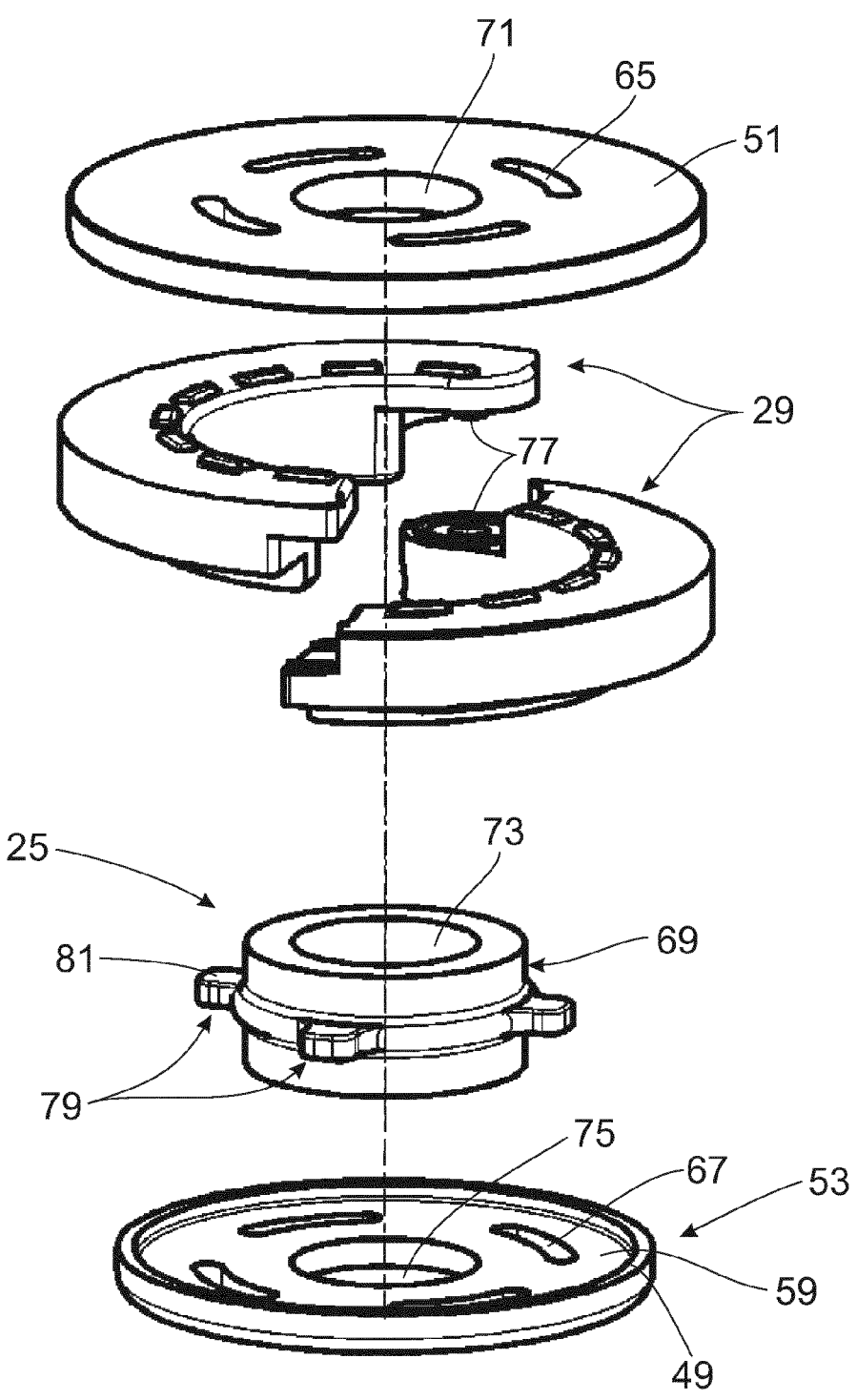

The construction of the valve support 25 will be apparent when FIGS. 2, 3, and 4 are viewed in conjunction. The valve support 25 comprises, inter alia, the two cover disks 51; 53 that are connected to one another via a support ring 69. All three component parts are centered at the piston rod 9 via their through openings 71; 73; 75.

The valve element 29 according to one aspect of the invention comprises two legs 29A; 29B that are connected to one another via a pivot bearing 77. The pivot bearing 77 has no connection to the valve support 25 as is shown by the cover disks 51; 53 which are closed in the relevant surface region. Consequently, the valve element 29 can be arranged in any rotational orientation within the annular groove 27. The valve element 29 is positioned at a radial distance from the annular groove base 61 by centering element 79 so that the valve element 29 cannot occupy any random radial initial position inside the annular groove 27.

The centering element 79 is formed by segments 81, which are supported at the base 61 of the annular groove 27. As shown in FIGS. 2 to 4, the segments 81 are combined at the support ring 69. The segments 81 have a lower axial height than that of the pressure space 63 such that the damping medium in the pressure space 63 can flow around the segments 81. The segments 81 can be constructed comparatively flat because the pressure inside of the pressure space 63 is everywhere the same and, therefore, does not exert a particularly high load on the segments 81.

In the initial position of the damping valve device 1, the valve element 29 contacts the segments 81 by its inner lateral surface 55 (FIG. 2) and accordingly has a defined cross section of the restriction 31 in circumferential direction. It may very well be desirable for the segments 81 to have a different radial extension and, therefore, for the restriction cross section 39 to also result differently along the circumference of the valve element 29. But because of the centering elements 79, the different restriction cross section 39 is not undefined but rather is optimized for a desired damping force characteristic of the damping valve device.

Figure 5:
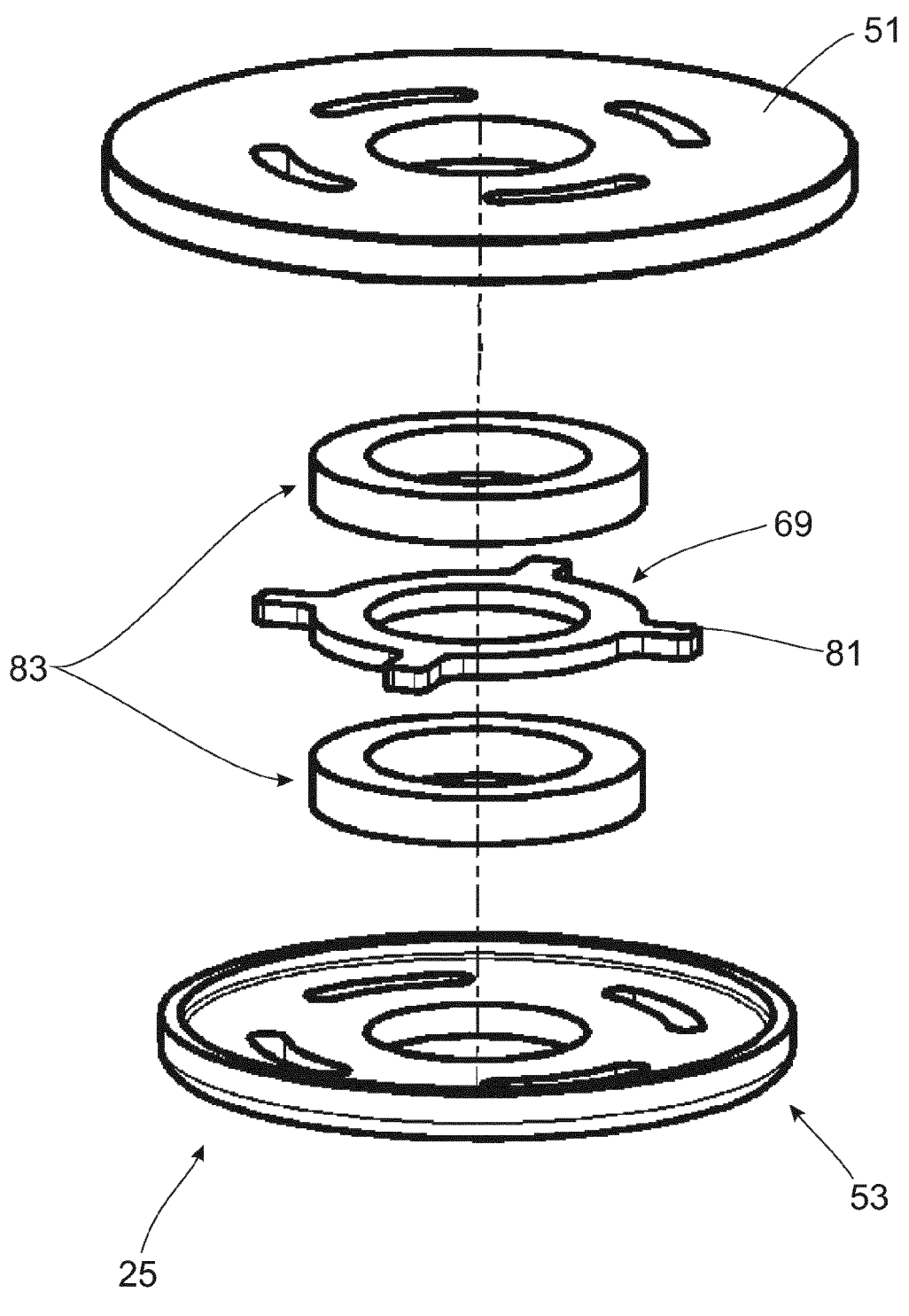
FIGS. 5-7 are valve supports.

FIG. 5 shows a modification of the valve support from FIGS. 2 to 4. By contrast, the support ring 69 forms the valve support 25 with at least one spacer sleeve 83 and two cover disks 51; 53. The support ring 69 is preferably constructed thin enough to enable production by punching. The axial installation space and, therefore, the surface area of the valve element 29 acted upon by pressure is determined by the spacer sleeves 83. Two spacer sleeves 83 are provided. However, the support ring 69 can also be arranged directly on one of the cover disks 51; 53. Like the rest of the component parts 51; 53, 69 of the valve support 25, the spacer sleeves 83 are also centered at the piston rod 9.

Figure 6:
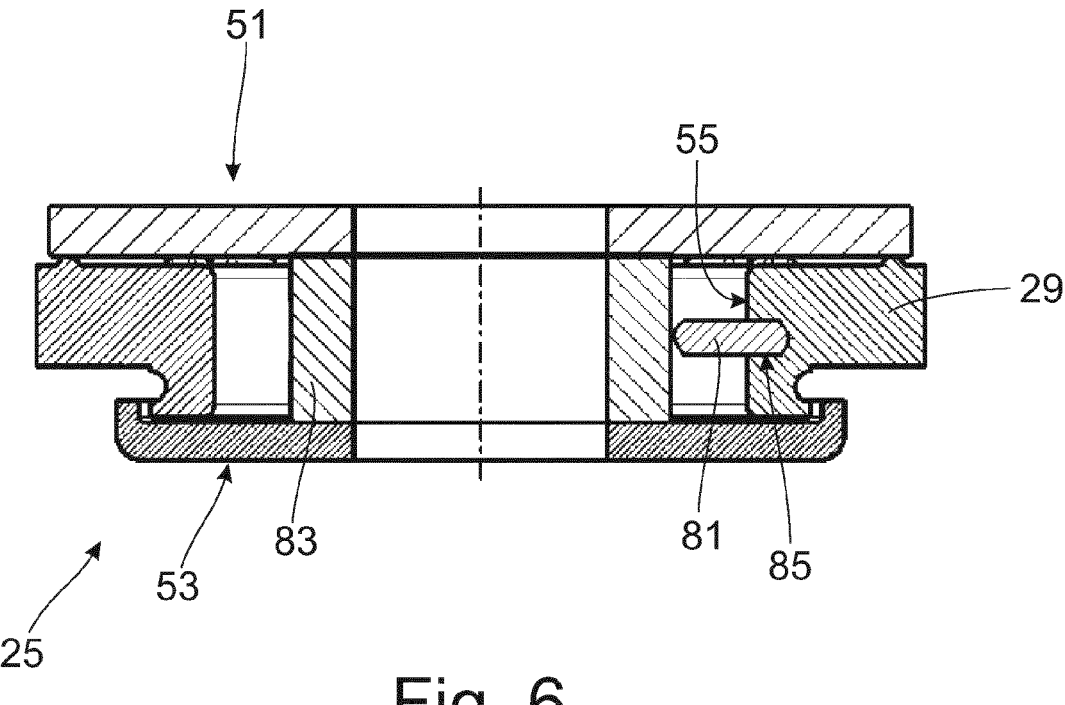

FIG. 6 shows a valve support 25 with a single spacer sleeve and two cover disks 51; 53 which form the annular groove 27. By contrast, the inner lateral surface 55 of the valve elements 29 supports the segments 81. The inner lateral surface 55 of the valve element 29 preferably has receiving openings 85 for the segments 81 in order to minimize the production expenditure for the centering elements.

Figure 7:
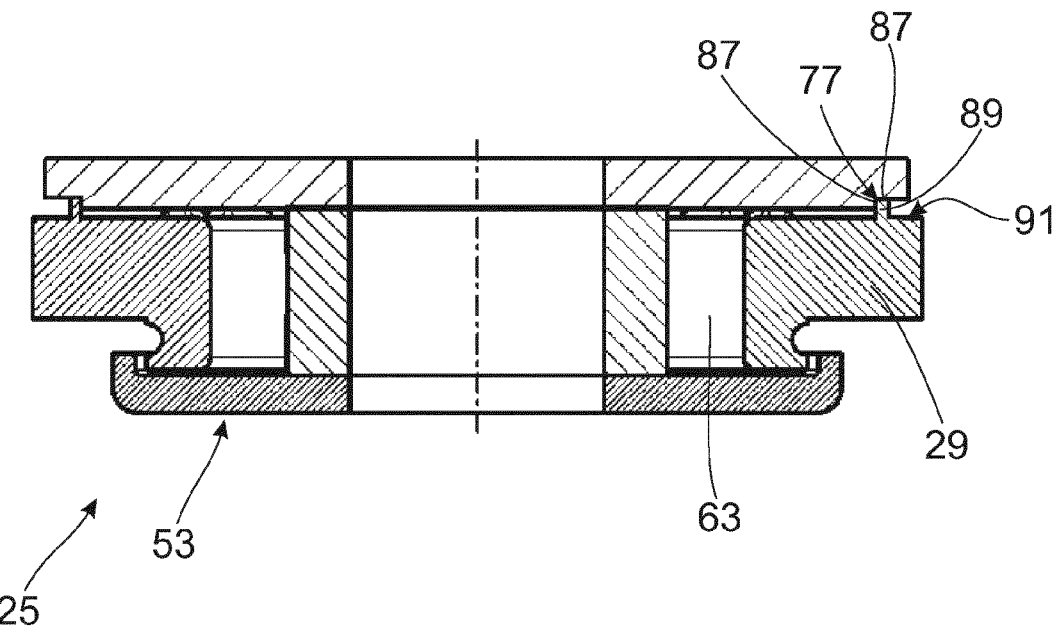

FIG. 7 shows a valve support 25 with a centering function for the valve element. At least one side surface 57 of the annular groove 27 has the centering elements for the valve element. The centering elements 77 are achieved by a shoulder 87 at one of the two cover disks 51; 53. Only a slight axial extension of the shoulder 87 is needed for the centering elements 77 so that the shoulder 87 is also producible by an embossment of the cover disks 51; 53. A plurality of axial projections 89 are formed at a cover surface 91 of the valve element 29 in direction of the annular groove side surface 57 of the cover disk 51 which also has the shoulder 87. The plurality of axial projections 89 cooperate with the shoulder 87 to exercise the centering function for the valve elements 29 inside of the pressure space 63. A single spacer sleeve 83 without special shaping is also sufficient in this instance.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A damping valve device for a vibration damper, comprising:

a restriction in connection with a valve element that is movable from an open position into a restriction position based on a flow velocity of a damping medium inside the restriction, wherein the valve element, as a variable-diameter annular element, moves in closing direction with increasing flow velocity of the damping medium within an annular groove of a valve support, wherein the annular groove is configured as a pressure space having at least one inflow orifice and at least one outflow orifice, and wherein the valve element is positioned at a radial distance from an annular groove base by centering elements formed by segments supported at the annular groove base, wherein the segments are combined to form a support ring, and wherein the support ring forms the valve support with at least one spacer sleeve and two cover disks.

2. The damping valve device according to claim 1, wherein the segments have a smaller axial height than that of the pressure space.

3. The damping valve device according to claim 1, wherein a lateral surface of the valve element carries the segments.

4. The damping valve device according to claim 3, wherein the lateral surface of the valve element has receiving openings for the segments.

5. Damping valve device according to claim 1, wherein at least one side surface of the annular groove has centering elements for the valve element.

* * * * *